R. L. ELLERY.
VALVE.
APPLICATION FILED MAY 31, 1917.
Reissued Dec. 18, 1917. 14,412.
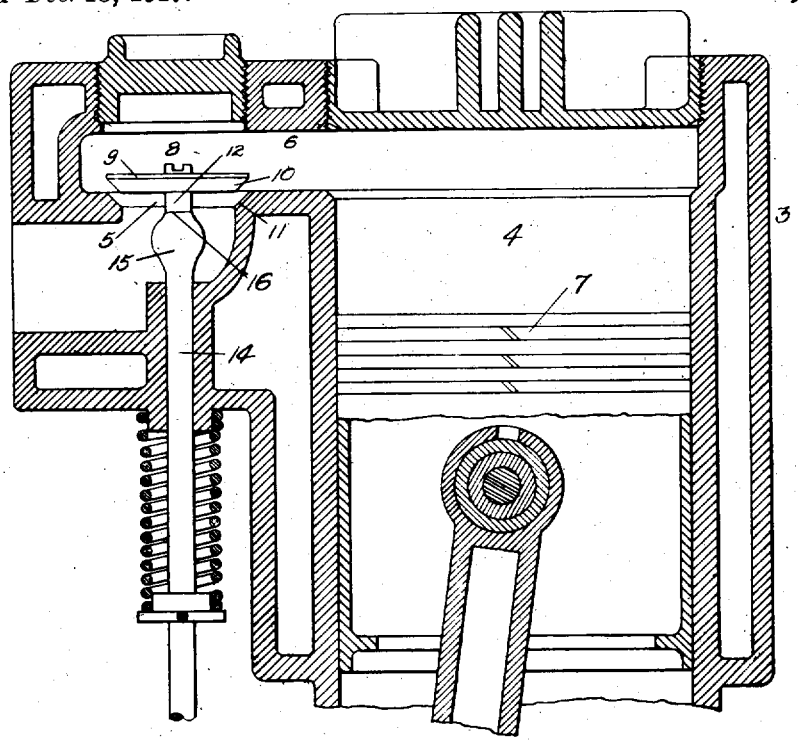
Fig. I
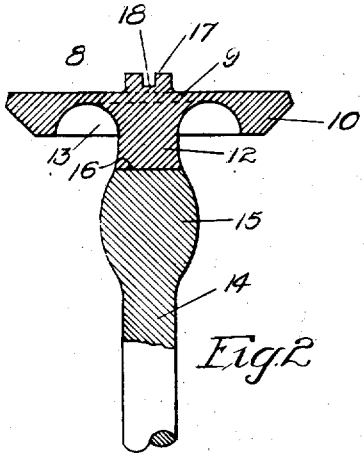
Fig. 2
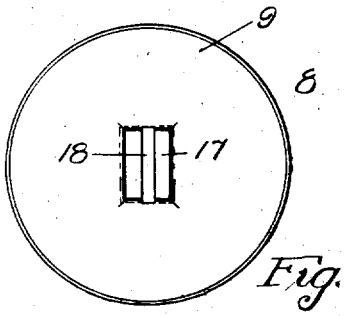
Fig. 3
Witnesses:
Andrew H. Intveen.
A. G. McCaleb.
Inventor
Robert L. Ellery.
By Williams Bradbury & Seg
Attorneys.

UNITED STATES PATENT OFFICE.

ROBERT L. ELLERY, OF TOLEDO, OHIO, ASSIGNOR TO PFANSTIEHL COMPANY, INC., OF NORTH CHICAGO, ILLINOIS, A CORPORATION OF NEW YORK.

VALVE.

14,412. Specification of Reissued Letters Patent. Reissued Dec. 18, 1917.

Original No. 1,141,870, dated June 1, 1915, Serial No. 769,028, filed September 10, 1913. Application for reissue filed May 31, 1917. Serial No. 172,104.

*To all whom it may concern:*

Be it known that I, ROBERT L. ELLERY, a citizen of the United States, residing at Toledo, in the county of Lucas and State of Ohio, have invented a certain new and useful Improvement in Valves, of which the following is a full, clear, concise, and exact description, reference being had to the accompanying drawings, forming a part of this specification.

This invention relates to improvements in valves, such for instance, as are used in connection with internal combustion engines and the like.

It has been common practice in the construction of the above type of valve to make the shanks, which must stand the wear due to the reciprocations of said valve of one kind of metal, such for instance, as carbon steel, while the heads of said valves which are exposed to intense heat from the engine cylinder, of metal which would be better adapted to withstand said heat, such as cast iron, nickel steel, etc., while the two members are welded together at a point adjacent said head. With the close proximity of said welding point to said head it has been exceedingly difficult with certain kinds of metal to produce a perfect weld and especially when the metal employed embraces exceptional heat radiating properties.

Tungsten steel, otherwise known as high speed steel, has been found to be the most desirable for valve heads because it can be operated at a high temperature without losing its hardness. It is very difficult, however, to weld this steel to carbon or low speed steel in a manner which provides a homogeneous union of the two metals. Valves are in use having tungsten steel heads and tungsten steel stems, the head and stem being formed of one piece of metal, the whole being made by a so-called swaging operation. Tungsten steel has the peculiarity of taking on a permanent expansion by reason of successive heatings. It is common practice in re-grinding reamers and the like made of high speed steel to heat and again cool them, whereupon it is found that the size of the reamer has been so increased that it may be reground to the same size as before it became worn. This peculiarity of high speed steel makes it undesirable for use as valves because, due to the successive heating and cooling of the stems, the stems become enlarged and frequently pound in the sleeves. It has been found absolutely necessary in using high speed tungsten steel stemmed valves to have the stems in the original installation so much smaller than the sleeves in which they operate that objectionable leakage and noise occur.

Prior to my invention I am not aware that any one was able to form a homogeneous weld between tungsten steel and low carbon steel. I am aware that others have disclosed lathe tools in which tungsten steel is said to be welded to carbon steel, but experience shows that these so-called welds are not homogeneous and solid throughout the entire area of contact and that they are only serviceable where the pressure exerted upon the two metals is toward the weld. One reason for this difficulty in welding high speed steel to ordinary steel lies in the great difference in the welding temperature of these steels. Another difficulty lies in the great difference in the co-efficient of expansion of tungsten steel and low speed steel. The third difficulty arises from the fact that the tungsten component of high speed steel oxidizes very readily at temperatures above 2000° Fahrenheit and forms a scale which prevents the tungsten steel from uniting homogeneously with other metals when it is attempted to unite them by the methods ordinarily used in welding. In addition to this the heat at which a weld must be made between a tungsten steel body and a carbon or low steel body is so high as to burn the carbon out of the carbon steel and thus destroy its qualities when it is attempted to weld it by the processes heretofore used.

The object of my invention is to provide a valve, particularly an exhaust valve for internal combustion engines, in which a tungsten or high speed steel head is homogeneously welded to a carbon or some other low speed steel stem.

Another object of the invention is to provide a valve having an inclined circumferential face and a stem formed integral with said head by welding or otherwise having an annular enlargement surrounding the portion of said shank which alines with said inclined circumferential face, whereby the stem may more successfully resist the deteriorating effects of the hot gases which escape through the port opened by moving said valve and to deflect said gases downwardly away from said stem.

The form of valve head and stem which I have adopted lends itself particularly well to electric welding since by that method when the electric current is passed between the tungsten steel and the carbon steel a greater current density may be obtained in the tungsten steel than in the carbon steel and the proper relative welding heats may be thus secured. All traces of scale or oxid must be ejected from the point of weld by the extrusion of a part of the molten metal at the union.

The invention consists in the combination and arrangement of parts whereby the above objects and certain other objects hereinafter appearing may be attained, as set forth in the following specification and particularly pointed out in the claims.

Referring to the drawings: Figure 1 is a detail sectional elevation of a portion of a gas engine with a valve embodying my invention shown in connection therewith;

Fig. 2 is a detail section of said valve; and

Fig. 3 is a plan view of said valve.

Like numerals refer to like parts throughout the several views of the drawings.

In the drawings, 3 is an engine casing having a cylinder 4 and an exhaust port 5 connected by a passage 6 with said chamber 4, a piston 7 being arranged in said cylinder to operate in the usual manner well known to those skilled in the art. A valve 8, of the type commonly known in the art as a puppet valve, is arranged in said casing in suitable bearings and is adapted to be reciprocated to open and close said port, said valve consisting of a head or disk 9 provided with a circumferential face 10 which is inclined at an angle to the axis of said head and fits a complementary face 11 formed by countersinking said casing. A stem 12 is formed on said head, preferably integral therewith, with its median axial line substantially coinciding with the axis of said head, while surrounding said stem and formed within said head is a recess 13 which is for the purpose of reducing the volume of the metal surrounding said stem and comprising said head.

Heretofore it has been the custom in constructing valves of this nature to make the head of a thickness sufficient to permit the grinding of a screw-driver slot within said head upon the opposite face from which the stem projects, but in so doing the head is necessarily heavy and of such a volume that considerable heat will be radiated thereby. This difficulty has been overcome by providing a projection 17 upon the head sufficiently large to contain a screw-driver slot 18 but no larger. This permits the recess in the opposite side of said head to extend for a substantial distance therethrough, while the stem 12 may be made smaller in diameter and in this way the amount of metal contained in said head will be materially reduced, thus permitting a more intense heat to be maintained at the end 16 of the stem 12.

The stem 12 terminates at 16 substantially within the apex of a cone whose sides include said inclined circumferential face, said apex adapted to be intersected by the continuation of said median axial line of said stem. A shank 14 is welded to the end of the stem 12, said shank having an annular or bulbous enlargement 15 in the vicinity of or surrounding the portion of said shank which is intersected, or in alinement with the sides of the cone including the face 10, thus when said valve is moved to open the port, as indicated in Fig. 1, the hot gases from the cylinder 4 will be directed through said port and against said enlargement which is of such a shape that as said gases contact with said enlargement they will be deflected, as indicated by the arrows "*a*", away from said shank. Thus said shank will be reinforced at a point where it is usually burnt away by the contact of said hot gases, while the force of said gases will be broken as they strike said enlargement owing to the refractive nature of its exterior surface. In forming the stem bulbously with its largest diameter located at the intersection of the cone, including the inclined face 10 of the valve, with said stem and gradually decreasing the diameter of said stem from said intersecting point there will be no shoulders or projections on said stem against which gases will directly impinge, thus substantially decreasing the deteriorating effects of said gases on said stem.

In the successful carrying out of the invention, as hereinbefore set forth, and particularly the welding of a tungsten steel head to a carbon steel stem, or at least a portion of the stem which has been referred to as the shank, an entirely new method of construction has become necessary and consists in providing a recess extending substantially through the head and surrounding the portion of said head to which the stem is to be welded, then hardening the head, then welding a shank of a different kind of material to the portion of said head which is surrounded by the recess hereinbefore mentioned and finally hardening the shank. This latter step of hardening the shank without changing the temper of the head is possible only when the head of the valve is constructed of tungsten steel as it permits the heating of the shank of the valve which has been welded to said head to a sufficient temperature to harden said shank without interfering with the temper of said hardened head, as one of the characteristics of tungsten steel is that it may be heated to a bright red sufficient to melt or soften ordinary steel without in the least softening said tungsten steel.

Having thus described my invention, what I claim and desire by Letters Patent to secure is:

1. A puppet valve for internal combustion engines having a high speed steel head and a low speed steel stem, the union between the head and stem being of solid homogeneous metal throughout.

2. A valve having, in combination, a head provided with an inclined circumferential face, a stem formed integral with said head, and an annular bulbous enlargement formed on said stem, the largest diameter of said enlargement being in the vicinity of the portion of said stem alining with said inclined face, said enlargement being gradually reduced from said largest diameter in both directions to the normal diameter of said stem.

3. A valve having, in combination, a head formed of tungsten steel and provided with a circumferential working face, a stem formed of the same material and integral with said head and surrounded by a recess formed within said head and extending substantially therethrough, and a shank of carbon steel welded to said stem.

4. A valve comprising a tungsten steel head provided with an inclined circumferential face, a stem formed integral with said head surrounded by a recess formed within and extending substantially through said head, and a carbon steel shank welded to said stem.

5. A puppet valve having a high speed steel head and a low speed steel stem united adjacent the head by a homogeneous weld extending throughout the entire juncture, the head and stem being provided with means for concentrating greater temperature in the head than in the stem in the region of weld at the time of performing the welding operation.

6. A puppet valve comprising a high speed steel head and low speed steel stem extending away from a central part of the head and autogenously united throughout the entire juncture of head and stem, the said head comprising parts substantially greater in diameter than the diameter of the union between head and stem.

In witness whereof, I hereunto subscribe my name this 28th day of May, A. D. 1917.

ROBERT L. ELLERY.

Witnesses:
C. W. Owen,
C. M. Zeigen.